United States Patent [19]
Knight

[11] Patent Number: 5,386,368
[45] Date of Patent: Jan. 31, 1995

[54] APPARATUS FOR MAINTAINING A BOAT IN A FIXED POSITION

[75] Inventor: Steven J. Knight, Mapleton, Minn.

[73] Assignee: Johnson Fishing, Inc., Mankato, Minn.

[21] Appl. No.: 165,985

[22] Filed: Dec. 13, 1993

[51] Int. Cl.[6] .................. G06F 15/50; B63H 21/22
[52] U.S. Cl. ............................. 364/432; 364/447; 364/457; 114/144 A; 440/6
[58] Field of Search ............... 364/432, 447, 449, 457, 364/460; 340/993; 114/144 A, 144 B, 144 E; 440/6, 1; 318/588

[56] References Cited

U.S. PATENT DOCUMENTS

| | | | |
|---|---|---|---|
| 3,500,025 | 3/1970 | Moulin et al. | 235/150.27 |
| 3,737,635 | 6/1973 | Hastings | 364/452 |
| 4,257,718 | 3/1981 | Rosa et al. | 405/167 |
| 4,454,583 | 6/1984 | Schneiderhan et al. | 364/449 |
| 4,513,378 | 4/1985 | Antkowiak | 364/450 |
| 4,519,335 | 5/1985 | Krautkremer et al. | 114/144 R |
| 4,542,464 | 9/1985 | Kramer | 364/457 |
| 4,564,909 | 1/1986 | Kramer | 364/457 |
| 4,881,080 | 11/1989 | Jablonski | 342/357 |
| 5,041,029 | 8/1991 | Kulpa | 114/144 E |
| 5,050,519 | 9/1991 | Senften | 114/144 E |

OTHER PUBLICATIONS

Bell et al., "Nonlinear Kalman Filtering of Long-Baseline, Short-Baseline, GPS, and Depth Measurements", IEEE 1991, pp. 131–136.

Emyr et al., "Precision Current Measurements Using Drifting Buoys Equipped with DECCA Navigator and GRGOS", IEEE 1990, pp. 7–13.

*Primary Examiner*—Gary Chin
*Assistant Examiner*—Tan Q. Nguyen
*Attorney, Agent, or Firm*—Foley & Lardner

[57] ABSTRACT

An apparatus for maintaining a floating boat or water vessel in a desired position is provided. The apparatus includes an electric trolling motor disposed to produce a thrust to pull the boat, a steering motor disposed to affect the orientation of the electric trolling motor, a position deviation detection unit, and a control circuit. The position deviation detection unit detects a deviation in the position of the boat from the desired position and transmits signals indicative of a deviation distance (the distance from the boat to the desired position) and a return heading (the direction of the desired position from the boat) to the control circuit. The control circuit causes the steering motor to steer the electric trolling motor in the return heading, and the electric trolling motor to propel the boat in the return heading, to return the boat to the desired position. [Various] A first embodiment[s] of the position deviation detection unit [are disclosed, including an embodiment which] detects a deviation in position based on signals from a satellite-based global positions system[,]. [an] Another embodiment [which] detects a deviation in position based on a signal from an anchored transmitter[,]. [and an] A third embodiment [which] detects a deviation in position based on the forces caused by the surrounding water when the boat drifts.

17 Claims, 3 Drawing Sheets

APPARATUS FOR MAINTAINING A BOAT IN A FIXED POSITION

FIELD OF INVENTION

The present invention relates generally to an apparatus for maintaining a boat in a substantially fixed position. More particularly, the present invention relates to an apparatus for controlling the direction and magnitude of the thrust of a propulsion unit on a boat to offset forces which would cause it to drift from its present location.

BACKGROUND OF THE INVENTION

In general, forces such as those caused by wind and water currents will cause an unrestrained boat or other watercraft to drift. However, there are many circumstances in which the user of the watercraft may desire to prevent such drift. For example, a fisherman may wish to keep his boat positioned over a particularly good fishing spot.

The conventional means for maintaining a boat in a particular location is a physical anchor connected by a rope or chain. To restrain the drift with an anchor, one must lower the anchor into the water until the anchor hits the ground beneath the boat. The friction of the anchor against the ground inhibits the watercraft's freedom to drift.

Unfortunately, physical anchors are not always a convenient or practical means for preventing drift. Specifically, the operation of lowering an anchor is relatively slow, and requires the full attention of the person performing the operation. Consequently, the use of a physical anchor is virtually impossible when time is of the essence. For example, when a fisherman who is trolling hooks a fish, he is typically not in a position to turn off a motor and lower and secure an anchor. Further, any attempt to do so could easily result in loss of the fish, or create a dangerous situation if the fisherman does not give the anchor operation his full attention.

Further, the conditions of the ground beneath a boat may prevent effective use of a physical anchor. For example, if the ground beneath a boat is hard and flat, an anchor may simply drag along the bottom as the boat drifts away from its desired position. On the other hand, if there is too much structure on the ground, the anchor and rope may become entangled in the structure.

A further disadvantage of a physical anchor is that a physical anchor can only be used in locations where the water is not deeper than the length of the rope or chain connecting the anchor to the watercraft. Thus, it is often difficult or impossible to maintain a boat positioned over the deepest holes in the bottom of a lake. The ability to maintain a position over such holes is particularly important to many fisherman, since the largest fish often populate such holes.

A further disadvantage of physical anchors is related to lowering and retrieving anchors. For example, a person or item may be pulled overboard if the person or thing becomes entangled in the rope as the anchor is lowered. Further, the rope and anchor are wet and often slimy and muddy when they are retrieved back into the boat.

In light of the foregoing, it is desirable to provide an apparatus for maintaining a boat in a substantially fixed position that is more easily and conveniently operated than a physical anchor. It is further desirable to provide an apparatus for maintaining a boat in a substantially fixed position whose efficacy is not dependent on the physical condition or depth of the water. It is further desirable to provide an apparatus for keeping a boat over a desired position whose operation does not involve the danger or inconvenience of lowering and raising a physical anchor.

SUMMARY OF THE INVENTION

According to one aspect of the present invention, an apparatus for maintaining the position of a floating boat over a desired position is provided. The apparatus includes an electric trolling motor connected to the boat. The electric trolling motor produces a thrust to pull the boat. The magnitude of the thrust is responsive to a thrust input signal.

The apparatus further includes a steering motor coupled to the electric trolling motor. The steering motor is disposed to affect the orientation of the electric trolling motor in response to a steering signal.

The apparatus further includes a position deviation detection unit for detecting a deviation in the position of the boat from the desired position and for generating position deviation signals indicative of a deviation distance and a return heading. The deviation distance is the distance from the boat to the desired position. The return heading is the direction the boat must move to return to the desired position.

The apparatus further includes a control circuit electrically coupled to the position deviation detection unit, the electric trolling motor and the steering motor. The control circuit is configured to receive the position deviation signals from the position deviation detection unit, to generate the steering signal to the steering motor to steer the electric trolling motor to the return heading, and to generate the thrust input signal to cause the electric trolling motor to propel the boat in the return heading, whereby the boat returns to the desired position.

According to one aspect of the invention, the position deviation detection unit includes means for determining the position of the boat based on position signals received from at least one transmitting device. According to one embodiment, the position signals include radio signals generated by at least two satellites. According to another embodiment, the transmitting device is a floating, anchored transmitter.

According to another aspect of the invention, the position deviation detection unit includes detecting means, such as tranducers, for detecting forces produced by the water surrounding the boat when the boat drifts from the desired position. Based on these forces, the position deviation detection unit determines a cummulative drift vector indicative of the distance of the boat from the desired position and the direction of drift from the desired position. The return heading is determined to be the direction opposite the direction of drift from the desired position.

BRIEF DESCRIPTION OF THE DRAWINGS

The features of the present invention, which are believed to be novel, are set forth with particularity in the appended claims. The invention, together with further features and advantages thereof, may best be understood by making reference to the following description taken in conjunction with the accompanying drawings, in the several figures of which like reference numerals identify like elements, and wherein:

DETAILED DESCRIPTION OF THE PREFERRED EMBODIMENT

According to one aspect of the present invention, an electronic control system is provided to perform the same function as a physical anchor. Specifically, an electronic control system is provided which maintains a floating boat or other watercraft in a desired position, but which overcomes the many disadvantages of a physical anchor outlined above. Since the electronic control system performs the functions of an anchor, it is referred to herein as an electronic anchoring system.

Figure 1:
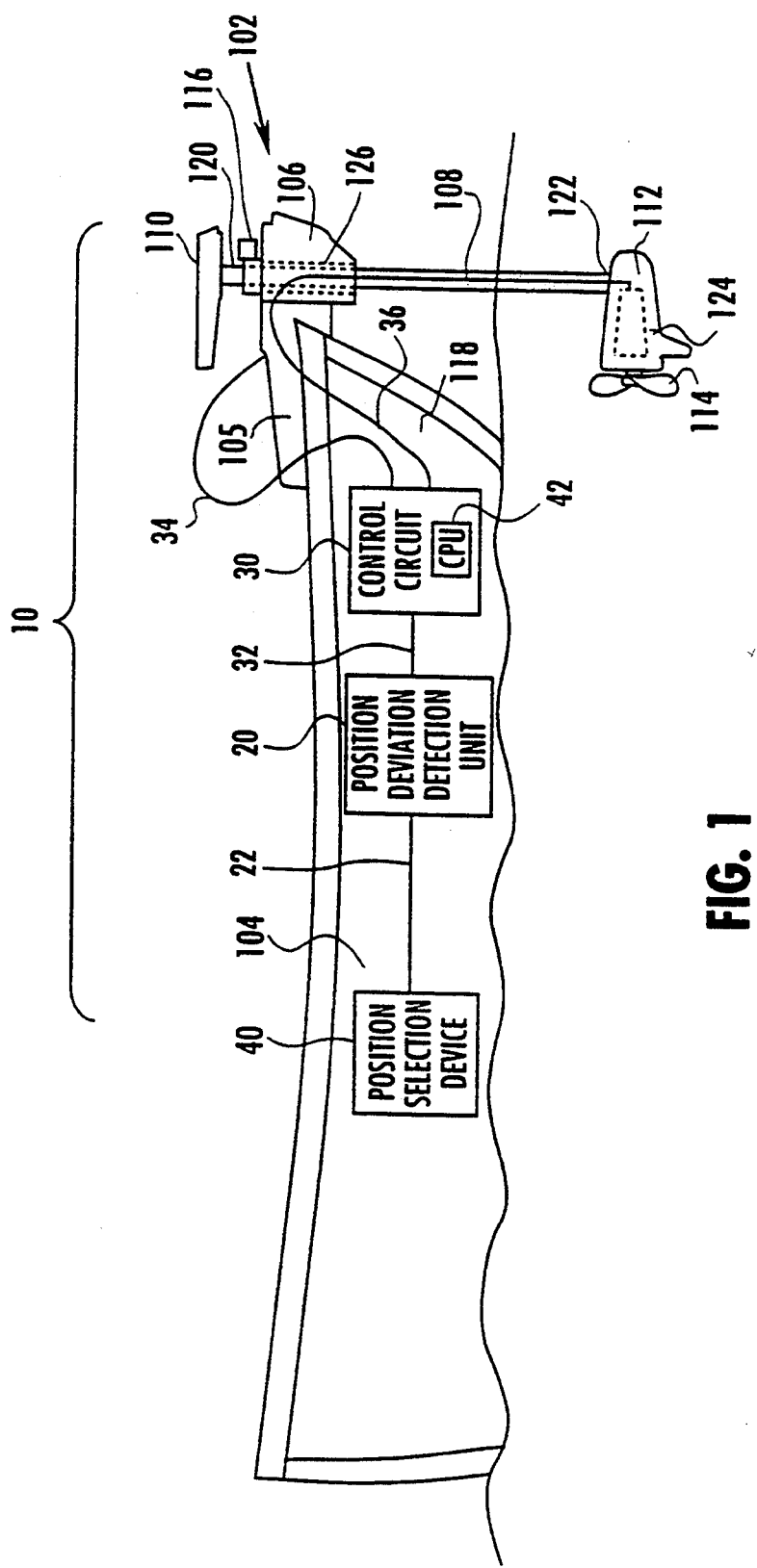
FIG. 1 illustrates a boat employing an electronic anchoring system according to an embodiment of the present invention.

FIG. 1 is an illustration of a boat employing a preferred embodiment of an electronic anchoring system 10. Electronic anchoring system 10 generally includes a position deviation detection unit 20, a control circuit 30, a desired position selection device 40 and a trolling unit 102.

Trolling unit 102 includes a base assembly 105, which is mounted to a bow 118 of a fishing boat 104 using bolts or any other convenient manner. Trolling unit 102 includes a control head 110, a steering motor 106, a collar 116, a shaft 108, a motor housing 112, and a propeller 114.

Shaft 108 has a first end 120 and a second end 122. Control head 110 is suitably comprised of a rigid, non-magnetic material, such as hard plastic, and is affixed to first end 120 such that control head 110 will rotate in the event that shaft 108 is rotated. Second end 122 of shaft 108 is affixed to motor housing 112 such that when shaft 108 is rotated, motor housing 112 also rotates. Propeller 114 is affixed to motor housing 112. Therefore, as shaft 108 is rotated, and control head 110 and motor housing 112 rotate, the direction of thrust, established by rotation of propeller 114, changes. Thus, for example, to steer right, shaft 108 may be rotated clockwise (as viewed from above); and to steer left, shaft 108 may be rotated counter-clockwise (as viewed from above). Shaft 108 is preferably comprised of a rigid material, such as steel, and is hollow, containing power lines to provide power to an electric thrust motor 124, disposed within motor housing 112.

Thrust motor 124 is connected to control circuit 30 by a line 36. Control circuit 30 generates a thrust signal over line 36 to control the speed of thrust motor 124, which in turn determines the thrust produced by propeller 114. Steering motor 106 is connected to control circuit 30 by a line 34. Steering motor 106 is controlled by steering signals generated by control circuit 30 over line 34, as will be described in greater detail hereafter. Desired position selection device 40 is connected to position deviation detection unit 20 by a line 22, and position deviation detection unit 20 is connected to control circuit 30 by a line 32.

Steering motor 106 includes a hollow portion 126. Hollow portion 126 is configured to slidingly receive shaft 108. Shaft 108 is maintained in proper relation to steering motor 106 by collar 116, which is mounted on shaft 108. Steering motor 106 rotatably engages shaft 108 such that when steering motor 106 is activated by control circuit 30, shaft 108 rotates. The rotation of shaft 108 changes the direction of thrust, established by the rotation of propeller 114, of trolling unit 102. Because trolling unit 102 is bow-mounted, boat 104 will always travel in the heading of trolling unit 102. The heading in which the thrust produced by propeller 114 propels trolling unit 102 is referred to hereafter as the thrust heading.

Desired position selection device 40 may be any device capable of generating an electronic signal when activated by a user. Desired position selection device 40 may therefore include a foot pedal, a hand switch, or any other convenient switch. When boat 104 is floating over a location at which a user desires to remain (such as a good fishing spot), the user activates desired position selection device 40, causing desired position selection device 40 to generate a position selection signal over line 22 to position deviation detection unit 20. The position over which boat 104 is floating when position selection device 40 is activated is referred to hereafter as the desired position.

Position deviation detection unit 20 is configured to receive the position selection signal over line 22, and to send a signal to control circuit 30 over line 32 to indicate that position selection device 40 has been activated. If thrust motor 124 is activated when position selection device 40 is activated, control circuit 30 transmits a thrust signal to thrust motor 124 over line 36 to cause thrust motor 124 to stop.

Position deviation detection unit 20 repetitively generates position deviation signals indicative of whether boat 104 has deviated from the desired position. Position deviation detection unit 20 transmits the position deviation signals to control circuit 30 over line 32. In a preferred embodiment, the position deviation signals include data indicative of the distance of between boat 104 and the desired position (the "deviation distance") and a return heading. The return heading is the heading which boat 104 must travel to return to the desired position (the heading opposite the direction of deviation).

The method by which position deviation detection unit 20 detects position deviations and the informational content of the position deviation signals will vary based on the specific implementation of position deviation detection unit 20. Various embodiments of position deviation detection unit 20 shall be described in greater detail hereafter.

Control circuit 30 preferably includes a programmed digital microprocessor 42 to perform the calculations to be described hereafter. Control circuit 30 receives the position deviation signals generated by position deviation detection unit 20. When the deviation distance, as indicated by the position deviation signals, exceeds a predetermined limit (which may be zero), control circuit 30 generates a steering signal to steering motor 106 to cause steering motor 106 to rotate shaft 108 to aim thrust motor 124 in the return heading (opposite the direction of the deviation). Once thrust motor 124 is oriented in the return heading, control circuit 30 generates a thrust signal over line 36 to activate thrust motor 124. The activation of thrust motor 124 causes propeller 114 to produce a thrust which propels trolling unit 102 towards the desired position.

Position deviation detection unit 20 repetitively generates the position deviation signals to control circuit 30. Based on the most-recently received position deviation signals, control circuit 30 generates updated steering signals over line 34 to maintain the orientation of thrust motor 124 in the most-recently determined return heading.

Once boat 104 has returned to the desired position (or within a predetermined distance of the desired position), as indicated by the position deviation signals, control circuit 30 generates a thrust signal over line 36 to deactivate thrust motor 124. The deactivation of thrust motor 124 prevents thrust motor 124 from propelling boat 104 over and beyond the desired position.

According to a preferred embodiment of the invention, position deviation detection unit 20 is a global positioning system receiver, such as receiver number GPS-50 generally available from Garmin International Incorporated. A global positioning system (or "GPS"), such as the NAVSTAR/GPS, consists of a plurality of satellites which transmit precisely-timed radio signals which enable a ground, sea, or airborne GPS receiver to determine the receiver's absolute self-position. With position data from three satellites, the longitude, latitude and altitude of a receiver may be obtained. However, if altitude and time are known, position data from only two satellites are required to obtain the longitude and latitude of a receiver.

A GPS receiver has several operational modes. In one mode (hereinafter the "waypoint mode"), data indicative of a position (waypoint) may be stored in the GPS receiver. The GPS receiver then generates return course data based on the stored waypoint information and the satellite signals. Return course data includes the present distance of the receiver from the waypoint, and the compass direction of the waypoint relative to the receiver.

Preferably, position deviation detection unit 20 is a GPS receiver operating in the waypoint mode, and control circuit 30 includes an autopilot configured to steer thrust motor 124 in a desired heading. Such an autopilot is described, for example, in U.S. Pat. No. 5,172,324 issued to Knight on Dec. 15, 1992, the contents of which are incorporated herein by reference.

According to this embodiment of position deviation detection unit 20, a user activates position selection device 40 when boat 104 is over a desired position, causing position selection device 40 to send a position selection signal to position deviation detection unit 20 over line 22. When position deviation detection unit 20 receives the position selection signal, position deviation detection unit 20 determines its absolute position based on radio signals from satellites. Position deviation detection unit 20 then stores data indicative of its absolute position (the "desired position") as waypoint data.

If thrust motor 124 is activated, control circuit 30 transmits a thrust signal over line 36 to deactivate thrust motor 124. Control circuit 30 then reads the position deviation signals generated by position deviation detection unit 20 over line 32. Since position deviation detection unit 20 is a GPS receiver in the waypoint mode, the position deviation signals include data indicative of the deviation distance and the return heading relative to the position of position deviation detection unit 20.

Control circuit 30 uses return heading information to generate a desired heading signal indicative of the heading that boat 104 must follow to return to the desired position. The desired heading signal is applied to the heading lock autopilot. The heading lock autopilot controls steering motor 106 to direct thrust motor 124 in the desired heading.

Once thrust motor 124 has been properly oriented, control circuit 30 generates a thrust signal over line 36 to cause propeller 114 to generate a thrust to propel boat 104 in the desired heading. Control circuit 30 periodically updates the desired heading signal and the thrust signal based on subsequent position deviation signals. Specifically, the desired heading signal is periodically updated to reflect the direction of the desired position from the current position of position deviation detection unit 20, and the thrust signal is updated to deactivate thrust motor 124 when the distance between position deviation detection unit 20 and the desired position is less than a predetermined distance.

Preferably, control circuit 30 generates the thrust signal based on thrust duration as well as deviation distance. For example, it may be dangerous to generate a thrust signal which causes thrust motor 124 to go from off to full speed. The acceleration caused by such control could cause a person or item within boat 104 to fall. Therefore, it is preferable to gradually increase or "ramp up" the speed of thrust motor 124. Likewise, the speed of thrust motor 124 may be gradually decreased as the deviation distance approaches zero (as boat 104 approaches the desired position).

Another preferred feature of control circuit 30 is a learning mode. In learning mode, control circuit 30 detects patterns or trends in deviations. When a particular deviation pattern is detected, control circuit 30 determines the direction and magnitude of the forces which would cause the identified deviation pattern, and adjusts its control to offset those forces. For example, consider the situation in which boat 104 drifts ten feet South of a desired position in ten minutes. Electronic anchoring system 10 returns boat 104 to the desired position, as described above. If, after ten more minutes, boat 104 is again ten feet South of the desired position, control circuit 30 may determine that a relatively constant force is pushing boat 104 to the South. Therefore, after returning boat 104 to the desired position, control circuit 30 generates a steering signal to direct thrust motor 124 northward, and a thrust signal to cause thrust motor 124 to produce a constant thrust to offset the drift-causing forces. This pattern recognition feature minimizes the magnitude and frequency of position oscillations.

While this embodiment of the invention has been described with respect to GPS signals, it may alternatively be implemented based on position-indicating radio signals from other sources. For example, position deviation detection unit 20 may be a LORAN receiver configured to receive LORAN signals from ground-based transmitters.

Figure 2:
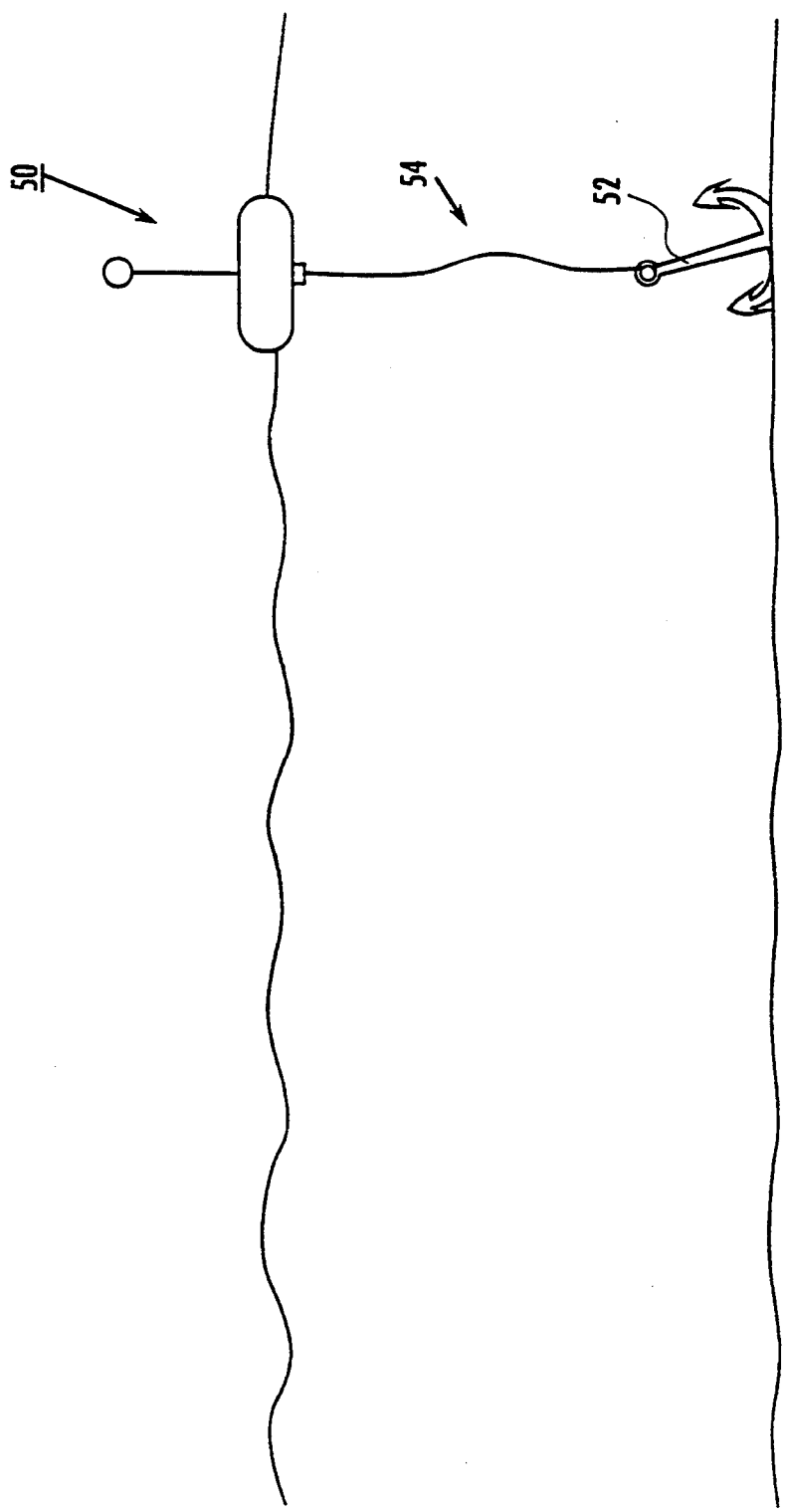
FIG. 2 illustrates an anchored homing signal transmitter according to an embodiment of the invention.

Referring to FIG. 2, it illustrates an anchored, floating, radio signal transmitter 50 which may be employed in an alternate embodiment of electronic anchoring system 10. According to this embodiment, position deviation detection unit 20 is configured to generate position deviation signals indicative of deviation direction and return heading based on radio signals generated by anchored transmitter 50.

When boat 104 is over a desired position, transmitter 50 is thrown overboard. Transmitter 50 is constrained from drifting from the desired position by a physical anchor 52 connected to transmitter 50 by a line 54. Position deviation detection unit 20 receives the signal transmitted by transmitter 50 and determines the direction and distance of position deviation detection unit 20 from transmitter 50. If the distance of position deviation detection unit 20 from transmitter 50 exceeds a predetermined distance, control circuit 30 generates a steering signal to steering motor 106 to orient thrust motor 124 towards transmitter 50, and generates a thrust signal to thrust motor 124 to cause thrust motor 124 to propel boat 104 towards transmitter 50.

While this embodiment still depends on a physical anchor (i.e. anchor 52), it is more convenient than merely anchoring boat 104 with a physical anchor. For example, it is easier and faster to toss transmitter 50 overboard than to lower a physical anchor. Further, anchor 52 and line 54 may be significantly smaller than an anchor and line for boat 104, since transmitter 50 is more easily restrained than boat 104 due to the relatively small size of transmitter 50.

Figures 3A, 3B:
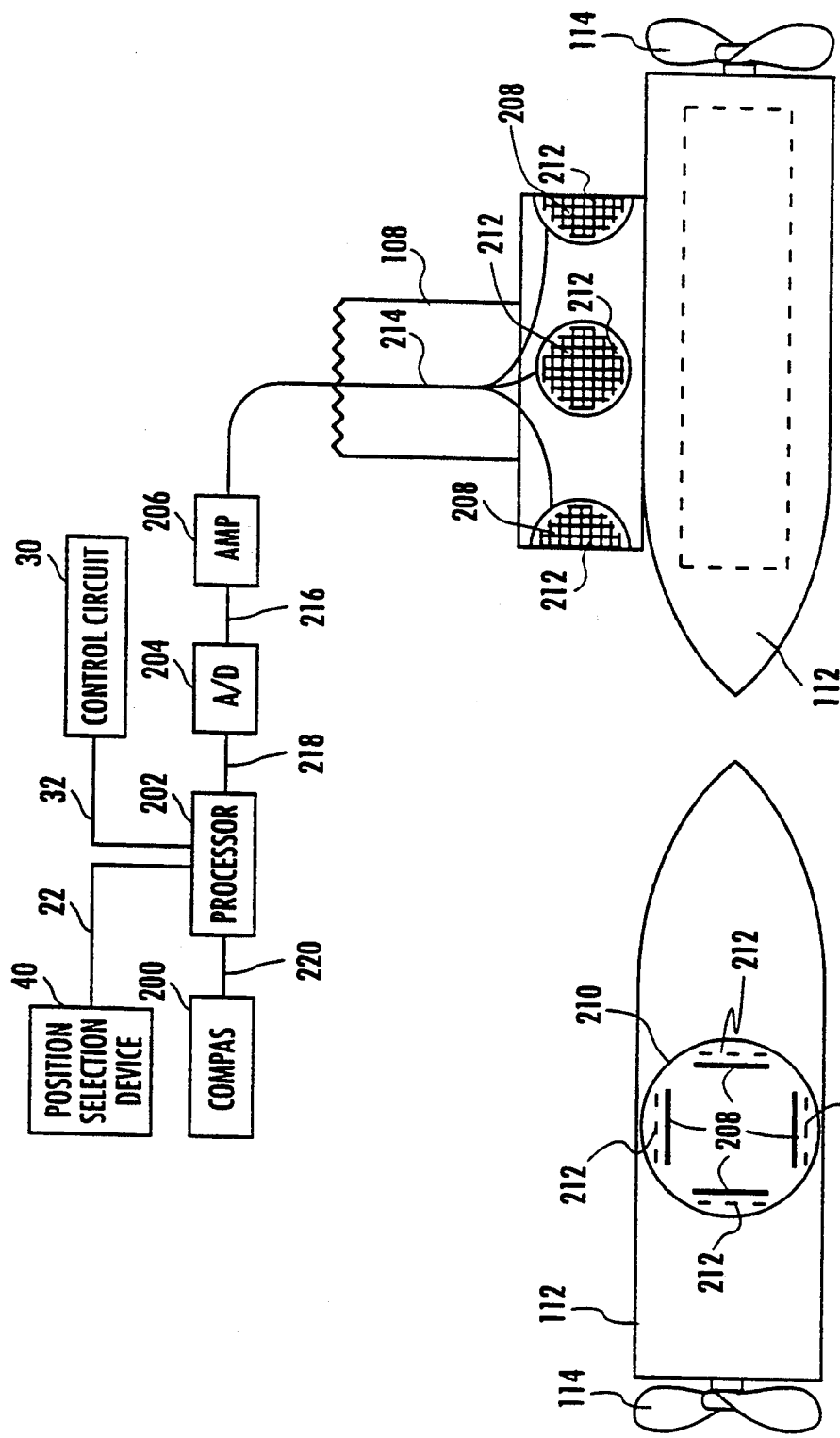
FIGS. 3A and 3B illustrate an electronic anchoring system according to an embodiment of the invention.

Referring to FIGS. 3A and 3B, an alternate embodiment of position deviation detection unit 20 is shown. According to this embodiment, position deviation detection unit 20 determines deviation distance and a return heading based on forces caused by the movement of boat 104 through the water that surrounds it. Since the position of boat 104 is determined by the movement of boat 104 relative to its surrounding water, it is assumed that the net current of the surrounding water is zero. Position deviation detection unit 20 generally includes a compass 200, a processor 202, an analog to digital converter 204, an amplification circuit 206, and a plurality of pressure transducers 208.

Pressure transducers 208 may be, for example item number 24PCEFA1G generally available from Micro-switch, a division of Honeywell. Transducers 208 are located in a holding unit 210 behind a plurality of protective screens 212. While the specific transducer configuration shown includes four transducers positioned at ninety-degree angles, other transducer configurations are possible.

Holding unit 210 is fixedly attached to shaft 108 just above motor housing 112. Thus located, holding unit 210 is entirely submersed in water when trolling unit 102 is in use. Water may freely flow through protective screens 212 to hit the faces of transducers 208. However, protective screens 212 protect transducers 208 from impact with larger objects, such as dirt or weeds.

Transducers 208 generate electrical signals in response to the force of the water against their face. When holding unit 210 is moving relative to the water surrounding it, the amplitude of the electrical signals generated by the transducers 208 facing the direction of travel will increase. The greater the pressure sensed by a given one of transducers 208, the greater the amplitude of the electrical signal generated by the given transducer 208.

The electrical signals generated by transducers 208 are transmitted over a plurality of lines 214 to amplification circuit 206. Amplification circuit 206 amplifies the signals, and sends the amplified signals to analog to digital converter 204 via a line 216. Analog to digital converter 204 converts the amplified signals into digital values, where the digital values reflect the amplitudes of the amplified signals. The digital values are then sent by analog to digital converter 204 to processor 202 over a line 218.

Processor 202 is configured to determine a current force vector (CFV) for each of transducers 208 based on the digital values. The CFV for a given one of transducers 208 includes the current force being applied to the given transducer (as reflected in the digital values) and the relative orientation of the given transducer. The CFVs for each of transducers 208 are summed, through simple vector addition, to produce a net CFV (NCFV).

The NCFV includes the magnitude and relative direction of the net force currently being produced by the water against transducers 208. The direction of relative net force of the water on transducers 208 indicates the direction, relative to transducers 208, in which boat 104 is currently drifting. To determine the actual compass heading of the current drift, processor 202 requires an input indicative of the compass orientation of transducers 208. This input is provided by compass 200.

Compass 200 is configured to generate an electronic signal indicative of the actual heading of thrust motor 124. Compass 200 may be, for example, the electronic compass disclosed in U.S. Pat. No. 5,172,324. Compass 200 is disposed in a fixed position relative to thrust motor 124 so that the orientation of compass 200 will reflect the orientation of thrust motor 124, and consequently, the orientation of holding unit 210 and transducers 208. For example, compass 200 may be mounted in control head 110 (FIG. 1). Compass 200 transmits the signal indicative of the actual compass heading of thrust motor 124 to processor 202 over a line 220.

Processor 202 receives the signal indicative of the actual compass orientation of the thrust motor 124 from compass 200. Based on the actual compass orientation of thrust motor 124 and the direction of the NCFV (i.e. the relative direction of current net force), processor 202 determines the actual compass heading of the current net force produced by the surrounding water on transducers 208. The heading of the current net force indicates the absolute direction of the current net drift.

The magnitude of the net force of the water on transducers 208 is proportional to the speed at which boat 104 is drifting. Since speed multiplied by time equals distance, processor 202 determines a distance-drifted value of a NCFV by multiplying the magnitude of the NCFV by the duration of the forces represented by the NCFV. For example, if a NCFV has a magnitude indicative of a ten-foot-per-minute drift, and the NCFV was determined based on the forces exerted on transducers 208 over a one minute period, then the distance-drifted value for the NCFV is ten feet. Since processor 202 is preferably a digital microprocessor, the actual duration of the forces represented in each NCFV will be significantly less than one minute. The compass heading of the force represented by each NCFV combined with the distance-drifted value of the NCFV, constitute a present drift vector (PDV).

Processor 202 repetitively calculates PDVs as described above, and adds each PDV to previously calculated PDVs to produce a cumulative drift vector (CDV). The magnitude of the CDV represents the net distance that boat 104 has drifted since desired position selection device 40 was activated, and the direction of the CDV represents the net direction that boat 104 has drifted since desired position selection device 40 was activated.

Based on the CDV, processor 202 determines a return heading and a deviation distance. Specifically, the return heading is the heading opposite the direction of drift indicated by the CDV, and the deviation distance is proportional to the magnitude of the CDV. Processor 202 transmits this information in position deviation signals to control circuit 30 over line 32. In response to the position deviation signals, control circuit 30 generates steering and thrust signals to cause thrust motor 124 to propel boat 104 back to the desired position.

As boat 104 is returning to the desired position, processor 202 continues to send updated return heading and deviation distance values to control circuit 30. These updated values are calculated as described above, based on the magnitude, direction and duration of the forces applied to transducers 208 as boat 104 is propelled back towards the desired position.

Preferably, processor 202 constantly monitors the magnitude and direction of the forces sensed by transducers 208, even when a desired position has not been selected. Consequently, when a user activates position selection device 40 to select a desired position, processor 202 is already aware of the initial speed and direction of drift. The information concerning the initial speed and direction of drift may be used by control circuit 30 to reduce initial response time. For example, initial response time may be significantly reduced by immediately deactivating thrust motor 124 and reversing the orientation of thrust motor 124 when electronic anchoring system 10 is activated while boat 104 is rapidly moving through the water. This situation may occur, for example, when a fisherman activates position selection device 40 when he hooks a fish while trolling.

While embodiment shown in FIGS. 3A and 3B uses transducers to detect motion of boat 104 relative to the water in which it resides, this motion may alternatively be detected by other mechanisms. For example, paddle wheels, spring loaded linear actuators, or pressure diaphragms may be used to measure the motion of boat 104 relative to the water. Further, while each subsystem of electronic anchoring system 10 has been described with its own unique components, some of the components may serve a function in more than one subsystem. For example, compass 200 may be the same compass as used in the heading lock autopilot of control circuit 30. Likewise, a single processor may be used to perform the calculations required by both processor 202 and control circuit 30. Additionally, in the GPS embodiment, position deviation detection unit 20 may be a external GPS receiver interfaced with control circuit 30, or a GPS receiver integrated with control circuit 30.

It is understood that the exact point of the desired position and the exact point on boat 104 which is returned to the desired position may vary. For example, if position deviation detection unit 20 is a GPS receiver, then the desired position is the position of the GPS receiver (or more specifically, the antenna of the receiver) when position selection device 40 is activated. Boat 104 is considered in the desired position when GPS receiver has returned to the position it occupied when position selection device 40 was activated. When transducers are used to detect deviation from the desired position, the desired position is the position of the transducers when position selection device 40 is activated, and boat 104 is considered to be in the desired position when the transducers have returned to the desired position. Preferably, the position deviation detection unit 20 is configured so that the desired position is the position of the trolling unit 102 when position selection device 40 is activated, and boat 104 is considered in the desired position when the trolling unit 102 has returned to the desired position, regardless of the specific nature of the position deviation detection unit 20.

It is to be further understood that, while the detailed drawings and specific examples given describe preferred embodiments of the invention, they are for the purpose of illustration only, and that the apparatus of the invention is not limited to the precise details and conditions disclosed and that various changes may be made therein without departing from the spirit of the invention which is defined by the following claims.

What is claimed is:

1. An apparatus for maintaining the position of a floating boat over a desired position, comprising:
   an electric trolling motor connected to the boat, the electric trolling motor producing a variable magnitude of thrust to propel the boat, the magnitude of the thrust being responsive to a first input signal;
   a steering motor coupled to the electric trolling motor, the steering motor being disposed to affect the orientation of the electric trolling motor in response to a second input signal;
   a position deviation detection unit for detecting a deviation in the position of the boat from the desired position and for generating position deviation signals indicative of a deviation distance and a return heading, the deviation distance being the distance from the boat to the desired position, the return heading being the direction of the desired position from the boat; and
   a control circuit electrically coupled to the position deviation detection unit, the electric trolling motor and the steering motor, the control circuit being configured to receive the position deviation signals from the position deviation detection unit, to generate the second input signal to the steering motor to steer the electric trolling motor in the return heading, and to generate the first input signal to cause the electric trolling motor to propel the boat in the return heading, whereby the boat returns to the desired position.

2. The apparatus of claim 1 wherein the position deviation detection unit includes means for determining the position of the boat based on position signals received from at least one transmitting device.

3. The apparatus of claim 2 wherein the position signals include radio signals generated by at least two satellites.

4. The apparatus of claim 3 wherein the position deviation detection unit includes a global positioning system receiver.

5. The apparatus of claim 4 further including a desired position selection device connected to the receiver, the receiver storing waypoint data indicative of the position of the receiver when the desired position selection device is activated, the desired position being the position indicated by the waypoint data.

6. The apparatus of claim 2 wherein the transmitting device is a floating, anchored transmitter.

7. The apparatus of claim 1 wherein the position deviation detection unit includes detecting means for detecting forces produced by the water surrounding the boat when the boat drifts from the desired position.

8. The apparatus of claim 7 further including a desired position selection device connected to the position deviation detection unit, the desired position being the position of the detecting means when the desired position selection device is activated.

9. The apparatus of claim 7 wherein the position deviation detection unit includes a plurality of transducers operatively connected to the boat, the plurality of transducers being disposed to reside below the surface of the water and being adapted to determine forces caused by the movement of the boat through the water that surrounds it.

10. The apparatus of claim 7 wherein the position deviation detection unit further includes a compass connected in a fixed position relative to the electric trolling motor, the compass configured to generate a signal indicative of the orientation of the electric trolling motor.

11. The apparatus of claim 10 wherein the position deviation detection unit includes a processor programmed to determine a net current force vector based on the forces produced by the water surrounding the boat, the net current force vector including the magnitude and relative direction of the forces, the relative direction being the direction of the forces relative to the position of the detecting means.

12. The apparatus of claim 11 wherein the processor is further programmed to determine a present drift vector based on the net current force vector, the signal generated by the compass, and the duration of the forces represented in the net current force vector, the present drift vector including the compass heading of the force represented by net current force vector and a distance-drifted value, the processor determining the distance-drifted value based on the magnitude of the net current force vector and the duration of the forces represented by the net current force vector.

13. The apparatus of claim 12 wherein the processor is further programmed repetitively generate present drift vectors, the processor determining a cumulative drift vector based on the present drift vectors, the cumulative drift vector including the deviation distance and a drift heading, the return heading being opposite the drift heading.

14. The apparatus of claim 1 wherein the control circuit includes a heading lock autopilot configured to maintain the electric trolling motor in a desired heading, the control circuit applying the return heading to the heading lock autopilot as the desired heading.

15. The apparatus of claim 1 further including a desired position selection device connected to the position deviation detection unit, the desired position being the position of the detecting means when the desired position selection device is activated, wherein, upon the activation of the desired position selection device, the control circuit generates the thrust input signal to stop the trolling motor if the trolling motor is activated, generates the steering signal to orient the trolling motor in the return heading, and generates the thrust input to activate the trolling motor when the trolling motor is oriented in the return heading.

16. The apparatus of claim 15 wherein the control circuit is configured to generate a thrust signal which gradually increases the thrust of the electronic trolling motor when the electronic trolling motor is oriented in the return heading.

17. The apparatus of claim 1 wherein the electric trolling motor is configured to pull the boat.

* * * * *